(12) United States Patent
Park et al.

(10) Patent No.: US 11,377,045 B2
(45) Date of Patent: Jul. 5, 2022

(54) DISTINCT USER AND ITEM DELIVERY FOR AUTONOMOUS VEHICLES

(71) Applicant: UATC, LLC, San Francisco, CA (US)

(72) Inventors: Min Kyu Park, South Pasadena, CA (US); Christopher Matthew D'Eramo, Bethel Park, PA (US)

(73) Assignee: UATC, LLC, Mountain View, CA (US)

( * ) Notice: Subject to any disclaimer, the term of this patent is extended or adjusted under 35 U.S.C. 154(b) by 672 days.

(21) Appl. No.: 16/174,960

(22) Filed: Oct. 30, 2018

(65) Prior Publication Data

US 2020/0051194 A1 Feb. 13, 2020

Related U.S. Application Data

(60) Provisional application No. 62/716,055, filed on Aug. 8, 2018.

(51) Int. Cl.
  *B60R 13/08* (2006.01)
  *B60N 2/30* (2006.01)
  (Continued)

(52) U.S. Cl.
  CPC ........ *B60R 13/0823* (2013.01); *B60N 2/0224* (2013.01); *B60N 2/30* (2013.01);
  (Continued)

(58) Field of Classification Search
  CPC .... B60R 13/0823; B60N 2/0224; B60N 2/30; G01C 21/343; G01C 21/3697; G01G 19/12; G05D 1/0088; G05D 1/0212; G05D 1/021; G05D 2201/0212; G05D 2201/0213; G06F 3/0482; G06F 16/29; G06Q 10/06315;
  (Continued)

(56) References Cited

U.S. PATENT DOCUMENTS 1,758,826 A  5/1930  Dellert
1,911,224 A  5/1933  Dellert
(Continued)

FOREIGN PATENT DOCUMENTS

CN  203623483  6/2014
CN  105189313  12/2015
(Continued)

*Primary Examiner* — Behrang Badii
(74) *Attorney, Agent, or Firm* — Dority & Manning, P.A.

(57) ABSTRACT

Systems and methods for controlling autonomous vehicles are provided. In one example embodiment, a computing system can obtain data indicative of a service assignment associated with an autonomous vehicle. The service assignment is indicative of a destination location to which to transport a user. The computing system can obtain data indicative of an item associated with the user that is to be transported to the destination location. The computing system can determine a first drop-off location for the user and a second drop-off location for the item based at least in part on the destination location. The first drop-off location for the user is different than the second drop-off location for the item. The computing system can cause the autonomous vehicle to initiate motion control to travel to the first drop-off location for the user and to travel to the second drop-off location for the item.

13 Claims, 8 Drawing Sheets

(51) Int. Cl.
  *B60N 2/02* (2006.01)
  *G01C 21/34* (2006.01)
  *G01G 19/12* (2006.01)
  *G05D 1/00* (2006.01)
  *G05D 1/02* (2020.01)
  *G06Q 10/06* (2012.01)
  *G06Q 30/02* (2012.01)
  *G06Q 50/28* (2012.01)
  *G06F 3/0482* (2013.01)
  *G08G 1/01* (2006.01)
  *G06F 16/29* (2019.01)

(52) U.S. Cl.
  CPC ............ *G01C 21/343* (2013.01); *G01G 19/12* (2013.01); *G05D 1/0088* (2013.01); *G05D 1/0212* (2013.01); *G06F 3/0482* (2013.01); *G06Q 10/06315* (2013.01); *G06Q 30/0283* (2013.01); *G06Q 50/28* (2013.01); *G08G 1/0125* (2013.01); *G05D 1/021* (2013.01); *G05D 2201/0212* (2013.01); *G05D 2201/0213* (2013.01); *G06F 16/29* (2019.01)

(58) Field of Classification Search
  CPC .... G06Q 30/0283; G06Q 50/28; G06Q 50/30; G08G 1/0125
  See application file for complete search history.

(56) References Cited

U.S. PATENT DOCUMENTS

| | | | |
|---|---|---|---|
| 2,132,279 | A | 10/1938 | Wicknick et al. |
| 2,563,347 | A | 8/1951 | Long |
| 2,642,119 | A | 6/1953 | Dary |
| 3,463,539 | A | 8/1969 | Racine et al. |
| 3,632,161 | A | 1/1972 | Arfaras et al. |
| 3,637,253 | A | 1/1972 | Maule et al. |
| 5,653,262 | A | 8/1997 | Hanemaayer |
| 5,738,408 | A | 4/1998 | Wu |
| 6,030,037 | A | 2/2000 | Ritch et al. |
| 6,264,261 | B1 | 7/2001 | Krafcik |
| 6,338,518 | B1 | 1/2002 | D'Annunzio et al. |
| 6,350,972 | B1 | 2/2002 | Wright et al. |
| 6,540,279 | B1 | 3/2003 | Bargiel |
| 6,925,679 | B2 | 8/2005 | Wallach et al. |
| 7,066,519 | B2 | 6/2006 | Rhodes et al. |
| 7,090,274 | B1 | 8/2006 | Khan et al. |
| 7,156,442 | B2 | 1/2007 | McManus et al. |
| 8,010,230 | B2 | 8/2011 | Zini et al. |
| 8,182,016 | B2 | 5/2012 | Kaip et al. |
| 8,186,735 | B2 | 5/2012 | Maceri et al. |
| 9,256,852 | B1 | 2/2016 | Myllymaki |
| 9,510,682 | B2 | 12/2016 | Hasegawa et al. |
| 9,533,625 | B2 | 1/2017 | Krishnan et al. |
| 2005/0028543 | A1 | 2/2005 | Whitehead et al. |
| 2007/0156540 | A1 | 7/2007 | Koren et al. |
| 2008/0185893 | A1 | 8/2008 | Behrens et al. |
| 2010/0052374 | A1 | 3/2010 | Bell et al. |
| 2015/0006005 | A1 | 1/2015 | Yu et al. |
| 2015/0379468 | A1 | 12/2015 | Danaher |
| 2016/0280095 | A1 | 9/2016 | Frye et al. |
| 2017/0354996 | A1 | 2/2017 | Lim et al. |
| 2017/0166173 | A1 | 6/2017 | Lauffer et al. |
| 2018/0079278 | A1 | 3/2018 | Kirpichnikov et al. |
| 2018/0211541 | A1* | 7/2018 | Rakah .................... G08G 1/148 |
| 2020/0042019 | A1* | 2/2020 | Marczuk ................ G08G 1/205 |
| 2020/0159251 | A1* | 5/2020 | Iwasaki ............ G08G 1/096805 |
| 2020/0160709 | A1* | 5/2020 | Ramot ............ B60W 60/00253 |
| 2021/0223051 | A1* | 7/2021 | Hochberg .......... G01C 21/3461 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

\* cited by examiner

DISTINCT USER AND ITEM DELIVERY FOR AUTONOMOUS VEHICLES

PRIORITY CLAIM

The present application is based on and claims priority to United States Provisional Application 62/716,055 having a filing date of Aug. 8, 2018, which is incorporated by reference herein.

FIELD

The present disclosure relates generally to controlling autonomous vehicles. In particular, an autonomous vehicle can be controlled to asynchronously deliver a passenger and an item that were transported in the autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a computing system including one or more computing devices, data indicative of a service assignment associated with an autonomous vehicle. The service assignment is indicative of a destination location to which to transport a user. The method includes obtaining, by the computing system, data indicative of an item associated with the user that is to be transported to the destination location. The method includes determining, by the computing system, a first drop-off location for the user and a second drop-off location for the item based at least in part on the destination location. The first drop-off location for the user is different than the second drop-off location for the item. The method includes causing, by the computing system, the autonomous vehicle to initiate a first motion control to travel to the first drop-off location for the user. The method includes causing, by the computing system, the autonomous vehicle to initiate a second motion control to travel to the second drop-off location for the item.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of a service assignment associated with an autonomous vehicle. The service assignment is indicative of a destination location associated with a user. The operations include obtaining data indicative of an item associated with the user. The item is onboard the autonomous vehicle. The operations include determining a first drop-off location for the user and a second drop-off location for the item based at least in part on the destination location. The first drop-off location for the user is different than the second drop-off location for the item. The operations include causing the autonomous vehicle to initiate a first motion control to travel to the first drop-off location for the user and a second motion control to travel to the second drop-off location for the item.

Yet another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include obtaining data indicative of a destination location to which a user is to be transported. The user is associated with an item to be transported. The operations include determining a first drop-off location for the user and a second drop-off location for the item based at least in part on the destination location. The first drop-off location for the user is different than the second drop-off location for the item. The operations include causing the autonomous vehicle to initiate a first motion control to travel to the first drop-off location for the user. The operations include causing the autonomous vehicle to initiate a second motion control to travel to the second drop-off location for the item.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
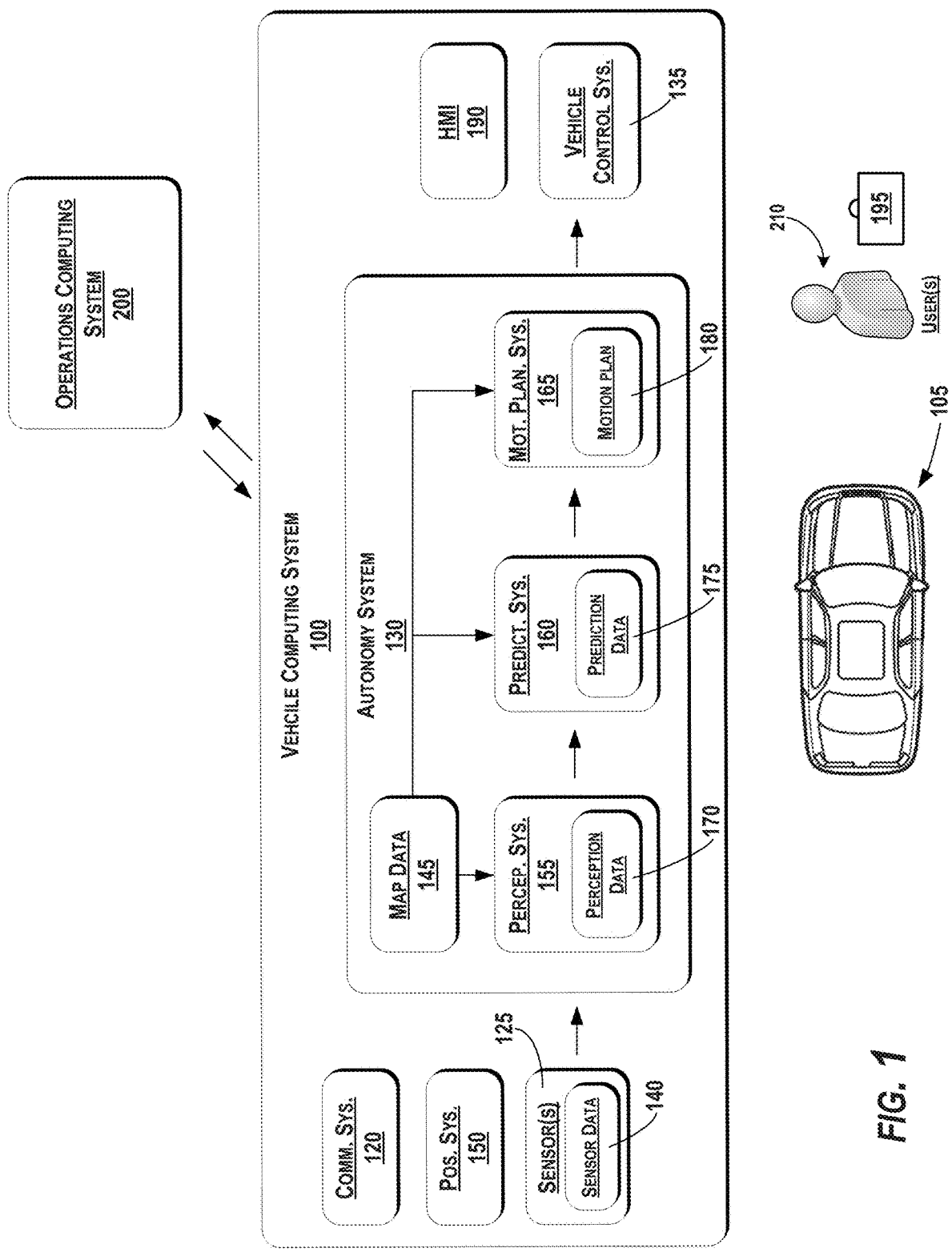
FIG. 1 depicts an example autonomous vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improving the ability of an autonomous vehicle to drop-off users and items in a more efficient manner. For instance, an autonomous vehicle can be utilized to perform vehicle services such as, for example, transportation services (e.g., rideshare services). The vehicle service(s) can be offered (e.g., via a mobile software application, website, etc.) to users by a service entity (e.g., a company that offers and/or coordinates the provision of vehicle services to users). In the event that a user requests a vehicle service, a computing system of the associated service entity can send a service assignment to an autonomous vehicle. The service assignment can include a request for the vehicle to perform the vehicle service for the user and a variety of information about the requested vehicle service including, for example, an origin location (e.g., a user's home) and a destination location (e.g., an airport). The autonomous vehicle can pick-up the user at the origin location. The autonomous vehicle can determine whether the user has one or more items (e.g., luggage, etc.) that will be transported with the user. This can be accomplished by onboard weight sensors, via information included in the service assignment, etc. To help prevent traffic build-up and more efficiently drop-off the user and the item(s), the autonomous vehicle can determine a first drop-off location for the user and a second, separate drop-off location for the item. By way of example, the autonomous vehicle can determine that a user should be dropped-off at the departure terminal of an airport and that the item (e.g., the user's luggage) should be dropped-off at a designated baggage area. The autonomous vehicle can autonomously travel to each of these drop-off locations to separately drop-off the user and the item(s). This can help avoid the delay caused by a user attempting to retrieve item(s) from the autonomous vehicle when the user is dropped-off at the destination location. Accordingly, the systems and methods of the present disclosure can improve the situational awareness of an autonomous vehicle that is transporting a user (and associated item(s)) to a destination location, while accounting for potential traffic impacts.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) for operating the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with one or more computing systems that are remote from the vehicle, as further described herein.

An autonomous vehicle can perform vehicle services for one or more service entities. A service entity can be associated with the provision of one or more vehicle services. For example, a service entity can be an individual, a group of individuals, a company, a group of companies (e.g., affiliated entities), and/or another type of entity that offers and/or coordinates the performance of one or more vehicle services to one or more users. For example, a service entity can offer vehicle service(s) to users via one or more software applications (e.g., on a user computing device), via a website, and/or via other types of interfaces that allow a user to request a vehicle service. As described herein, the vehicle services can include transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services. The service entity can utilize an operations computing system to coordinate the provisions of vehicle service(s) associated with the service entity.

A user can provide (e.g., via a user device) a request for a vehicle service to an operations computing system associated with the service entity. The request can indicate the type of vehicle service that the user desires (e.g., a transportation service, a delivery service, a courier service, etc.), one or more locations (e.g., an origin location, a destination location, etc.), timing constraints (e.g., pick-up time, drop-off time, deadlines, etc.), service parameters (e.g., a need for handicap access, a need for trunk space, etc.), and/or other information. The operations computing system of the service entity can process the request and identify one or more autonomous vehicles that may be able to perform the requested vehicle services for the user. The operations computing system can send a service assignment indicative of the requested vehicle services to an autonomous vehicle (e.g., via the service entity's computing platform). The vehicle computing system can obtain data indicative of the service assignment associated with an autonomous vehicle. The service assignment can be indicative of, for example, an original location (e.g., at which to pick-up a user) and a destination location (e.g., to which to transport a user).

The vehicle computing system can obtain data indicative of an item associated with the user that is to be transported with the user. For instance, in the user's service request, the user may specify that the user will be accompanied by one or more item(s). In some implementations, the service request can simply indicate the presence of one or more items. In some implementations, the service request can indicate characteristics of the item(s) such as, for example, the type, size, weight, shape, number, etc. The item(s) can include, for example, luggage, baggage, packages, personal effects, and/or any other items. The data indicative of the service assignment obtained by the vehicle computing system can indicate that the item(s) are to be transported with the user and/or other characteristics of the item(s).

In some implementations, the vehicle computing system can obtain data indicating that an item is onboard the autonomous vehicle via one or more sensor(s) located onboard the autonomous vehicle. The sensor(s) can include image sensors (e.g., cameras, etc.), motion sensors, weight sensors, and/or other types of sensors. For example, the autonomous vehicle can include one or more sensors associated with a compartment of the vehicle (e.g., the trunk) and such sensor(s) can be configured to obtain sensor data indicating that the compartment has been accessed (e.g., opened by a user) and/or closed. The vehicle computing system can determine that an item is onboard the vehicle when the compartment sensor indicates that the compartment has been accessed (and closed). Additionally, or alternatively, the autonomous vehicle can include an onboard weight sensor (e.g., located in the vehicle's trunk) that can obtain sensor data indicative of the presence of an item onboard the autonomous vehicle (e.g., within the trunk).

In some implementations, the autonomous vehicle can be configured to obtain data associated with an item via a user device. For instance, a user can obtain image data of an item (e.g., luggage, etc.) via an image capture device of a user device (e.g., a camera, etc.). The user device can provide the image data to a remote computing system and/or an autonomous vehicle. The autonomous vehicle can obtain the image data (e.g., from the user device, from a remote computing system, etc.). The image data can be indicative of and/or analyzed to determine characteristic(s) of the item (e.g., size, shape, weight, type, etc.). The autonomous vehicle can obtain the image data when it obtains the service assignment, before it arrives at the origin location, while it is at the origin location, and/or after it leaves the origin location.

In some implementations, the autonomous vehicle can be configured to perform an item-related action that is associated with the user's requested destination location. For instance, the service assignment can indicate that the user is to be transported to an airport. The vehicle computing system can obtain data indicative of the weight of an item of the user when the item is placed onboard the autonomous vehicle (e.g., via a trunk weight sensor). The vehicle computing system can determine whether the item is associated with an overage charge based at least in part on the weight of the item. For example, the user may have entered which airline the user is flying so that the autonomous vehicle can determine a convenient drop-off location for the user (e.g., the specific-airline departure terminal). The vehicle computing system can obtain data associated with the airline's baggage parameters (e.g., weight limits, fees, numbers, etc.) and determine whether the item onboard the autonomous vehicle is associated with an overage charge because the weight of the item exceeds the airline's weight limit. In some implementations, the vehicle computing system can determine whether the item is associated with an overage charge based at least in part on other characteristic(s) of the item (e.g., the size, shape, etc.). Such information can be obtained via image data and/or sensor data, as described herein.

In the event that the vehicle computing system determines that the item would be associated with an overage charge, the vehicle computing system can inform the user. For example, the vehicle computing system can provide, for display via a user interface on a display device, data indicative of the overage charge associated with the item. Such data can be displayed, for example, via a user device associated with the user (e.g., a mobile phone, etc.) and/or a display device associated with the autonomous vehicle (e.g., an onboard tablet, etc.). Additionally, or alternatively, the vehicle computing system can provide, for output via an audio output device (e.g., speaker, etc.), data indicative of an audio notification that indicates the item is likely to experience an overage charge. In some implementations, the user can complete a transaction to address the overage charge. For example, the user can provide a user input associated with a user interface (e.g., on the user's phone, onboard tablet, etc.) to pay for the overage fee. In some implementations, the autonomous vehicle can include a printing device to generate a printed medium (e.g., sticker, ticket, etc.) that indicates the overage fee has been addressed.

In some implementations, the user and the item can enter the autonomous vehicle asynchronously. For instance, the item(s) can be put onboard the autonomous vehicle at a first time and a user can board the autonomous vehicle at a second time (a separate time occurring after the first time), or vice versa. By way of example, an individual (e.g., a hotel bellhop) can put the item (e.g., baggage) in the autonomous vehicle at a first time. The item can be put into the autonomous vehicle at an origin location (e.g., a hotel). The autonomous vehicle can pick-up the user at a second time, after the first time. For example, the user associated with the item can board the autonomous vehicle at the origin location (e.g., at the hotel) or another location (e.g., a retail store) at the second time, after the first time (when the item entered into the autonomous vehicle).

The vehicle computing system can determine separate drop-off locations for the user and the item(s). For instance, the vehicle computing system can determine a first drop-off location for the user and a second drop-off location for the item based at least in part on the user's requested destination location. The first drop-off location for the user is different than the second drop-off location for the item. The drop-off location(s) can be sub-locations associated with the destination location.

The vehicle computing system can determine the drop-off location(s) based at least in part on map data associated with the destination location. Such map data can provide more granular information about the layout, infrastructure, etc. of the destination location. By way of example, the destination location can be an airport. The vehicle computing system can obtain map data associated with the airport. This map data can be indicative of the departure area, arrival area, parking area, baggage area, and/or other areas, zones, travel ways, etc. of the airport. The vehicle computing system can determine that the user desires to travel to the airport and obtain (e.g., from a local and/or remote memory) the map data associated with the airport. The vehicle computing system can use the map data to determine where to drop-off the user and where to drop-off any associated item(s). For example, the vehicle computing system can determine where the first drop-off location for the user should be based on where the map data indicates that the user's airline departure area is located. The vehicle computing system can determine where the second drop-off location for the item (e.g., luggage) should be based on where the map data indicates a baggage drop-off area is located.

The autonomous vehicle can travel to the first and second drop-off locations to drop-off the user and the item(s) at their respective locations. For instance, the vehicle computing system can cause the autonomous vehicle to initiate motion control(s) to travel to the first drop-off location for the user and the second drop-off location for the item(s). A motion control can be an operation, action, etc. that is associated with controlling the motion of the vehicle. For instance, the vehicle computing system (e.g., an onboard autonomy system) can determine a motion plan that can be provided to the vehicle control system(s) of the vehicle. The vehicle control system(s) can be associated with a vehicle controller (e.g., including a vehicle interface) that is configured to implement the motion plan. The vehicle controller can, for example, translate the motion plan into instructions for the appropriate vehicle control component (e.g., acceleration control, brake control, steering control, etc.). The vehicle computing system can generate a motion plan, which can be implemented such that the autonomous vehicle travels to the first drop-off location for the user and the second drop-location for the item(s). The autonomous vehicle can travel to the first drop-off location before the second drop-location, or vice-versa. The user can disembark from (e.g., exit, etc.) the autonomous vehicle at the first drop-off location (e.g., at the departure area of an airport) and the item(s) can be removed from the autonomous vehicle at the second drop-off location (e.g., at the baggage area of the airport). In some implementations, the item(s) can be placed in a removable compartment of the autonomous vehicle, which can be utilized to remove the item(s) from the autonomous vehicle and transport them to a certain area (e.g., to a conveyor for processing).

The systems and methods described herein provide a number of technical effects and benefits. For instance, the technology of the present disclosure allows an autonomous vehicle to better determine where to drop-off a user and item(s) associated with the user. This can allow for a more efficient departure from the autonomous vehicle by the user (and the items). Accordingly, the autonomous vehicle can save time and reduce potential impact on traffic when dropping-off a user. This can improve the efficiency with which the autonomous vehicle can provide vehicle services (e.g., user transportation services). Moreover, this can help build confidence in autonomous vehicle technology and better integrate an autonomous vehicle into the transportation infrastructure.

The systems and methods of the present disclosure can provide an improvement to vehicle computing technology, such as autonomous vehicle computing technology. For instance, the systems and methods improve the situational awareness of the autonomous vehicle to provide a vehicle service to a user. For example, a computing system (e.g., an onboard vehicle computing system of an autonomous vehicle) can obtain data indicative of a service assignment associated with an autonomous vehicle. As described herein, the service assignment can be indicative of a destination location for a user. The computing system can obtain data indicative of an item associated with the user (e.g., an item to be transported with the user, an item that is onboard the autonomous vehicle, etc.). The computing system can determine a first drop-off location for the user and a second drop-off location for the item based at least in part on the destination location. The first drop-off location for the user is different than the second drop-off location for the item. The computing system can cause the autonomous vehicle to initiate a first motion control to travel to the first drop-off location for the user and a second motion control to travel to the second drop-off location for the item. In this way, the vehicle computing system can determine and implement a more efficient approach to drop-off users and associated item(s) at a destination location. As such, the systems and methods can improve the vehicle computing system's situational awareness by allowing it to take into account the circumstances of the user (e.g., the particular destination location and the presence of associated item(s)) when making a determination as to how to best provide vehicle services. Such approach can also increase the efficiency of dropping-off users/items while providing an additional benefit of minimizing the autonomous vehicle's impact on traffic.

With reference now to the FIGS., example embodiments of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for determining various drop-off locations, controlling an autonomous vehicle, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). For example, the communications system 120 can allow the autonomous vehicle to communicate and receive data from an operations computing system 200 of a service entity. In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can include other sensors configured to acquire data associated with the autonomous vehicle 105. For example, the autonomous vehicle 105 can include inertial measurement unit(s), and/or other sensors.

The autonomous vehicle 105 can include one or more vehicle sensor(s) 125 that can be configured to acquire sensor data associated with a user 210 and/or an item 195. The item(s) can include, for example, luggage, baggage, packages, personal effects, non-perishable or perishable items, and/or any other items. The autonomous vehicle can include one or more weight sensors that are configured to obtain data indicative of the presence and/or weight of a user 210 (e.g., a seat-positioned sensor, etc.) and/or the presence and/or the weight of an item 195 (e.g., a trunk-positioned sensor, etc.). The autonomous vehicle 105 can include one or more motion sensors configured to acquire data indicative of the presence and/or motion of a user 210 and/or item 195. The autonomous vehicle 105 can include one or more sensors (e.g., cameras, infrared, scanner, etc.) configured to acquire data indicative of the size, shape, orientation, position, etc. of the user 210 and/or item 195 (e.g., trunk/cabin interior facing sensors, etc.). A user 210 can be presented with an option, opt-out, permission request, etc. as to whether data associated with the user 210 and/or item 195 can be acquired. To the extent any such data is acquired, it can be securely stored and deleted at or soon after a related vehicle service is completed.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can include an HMI ("Human Machine Interface") 190 that can output data for and accept input from a user of the autonomous vehicle 105. The HMI 190 can include one or more output devices such as display devices, speakers, tactile devices, etc. For instance, the autonomous vehicle 105 can include a plurality of display devices. The display devices can include smart glass technology, a display screen, CRT, LCD, plasma screen, touch screen, TV, projector, other types of display devices and/or a combination thereof. One or more of the display devices can be included in a user device (e.g., personal computer, tablet, mobile phone, etc.).

The plurality of display devices can include a first display device and a second display device. The first display device can be associated with the exterior of the autonomous vehicle 105. The first display device can be located on an exterior surface and/or other structure, of the autonomous vehicle 105 and/or configured such that a user can view and/or interact with the first display device (and/or a user interface rendered thereon) from the exterior of the autonomous vehicle 105. For example, one or more windows of the autonomous vehicle 105 can include smart glass technology that can perform as the first display device. The second display device can be associated with the interior of the autonomous vehicle 105. The second display device can be located on an interior surface and/or other structure (e.g., seat, etc.) of the autonomous vehicle 105 and/or configured such that a user can view and/or interact with the second display device (and/or a user interface rendered thereon) from the interior of the autonomous vehicle 105. For example, a user device (e.g., tablet, etc.) located within the interior of the autonomous vehicle 105 can include the second display device.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for one or more service entities. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 200 to communicate with, coordinate, manage, etc. autonomous vehicle(s) to perform the vehicle services of the service entity. A telecommunications network system can allow an autonomous vehicle 105 to utilize the back-end functionality of the respective operations computing system 200 (e.g., service assignment allocation, vehicle technical support, etc.).

An operations computing system 200 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system 250, etc.), a user device, etc. The operations computing system 200 can be or otherwise included in a data center for the service entity, for example. The operations computing system can be distributed across one or more location(s) and include one or more sub-systems. The computing device(s) of an operations computing system 200 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle(s), etc.

In some implementations, the operations computing system 200 and the vehicle computing system 100 can indirectly communicate. For example, a vehicle provider computing system can serve as an intermediary between the operations computing system and the vehicle computing system 100 such that at least some data is communicated from the operations computing system 200 (or the vehicle computing system 100) to the vehicle provider computing system and then to the vehicle computing system 100 (or the operations computing system 200).

Figure 2:
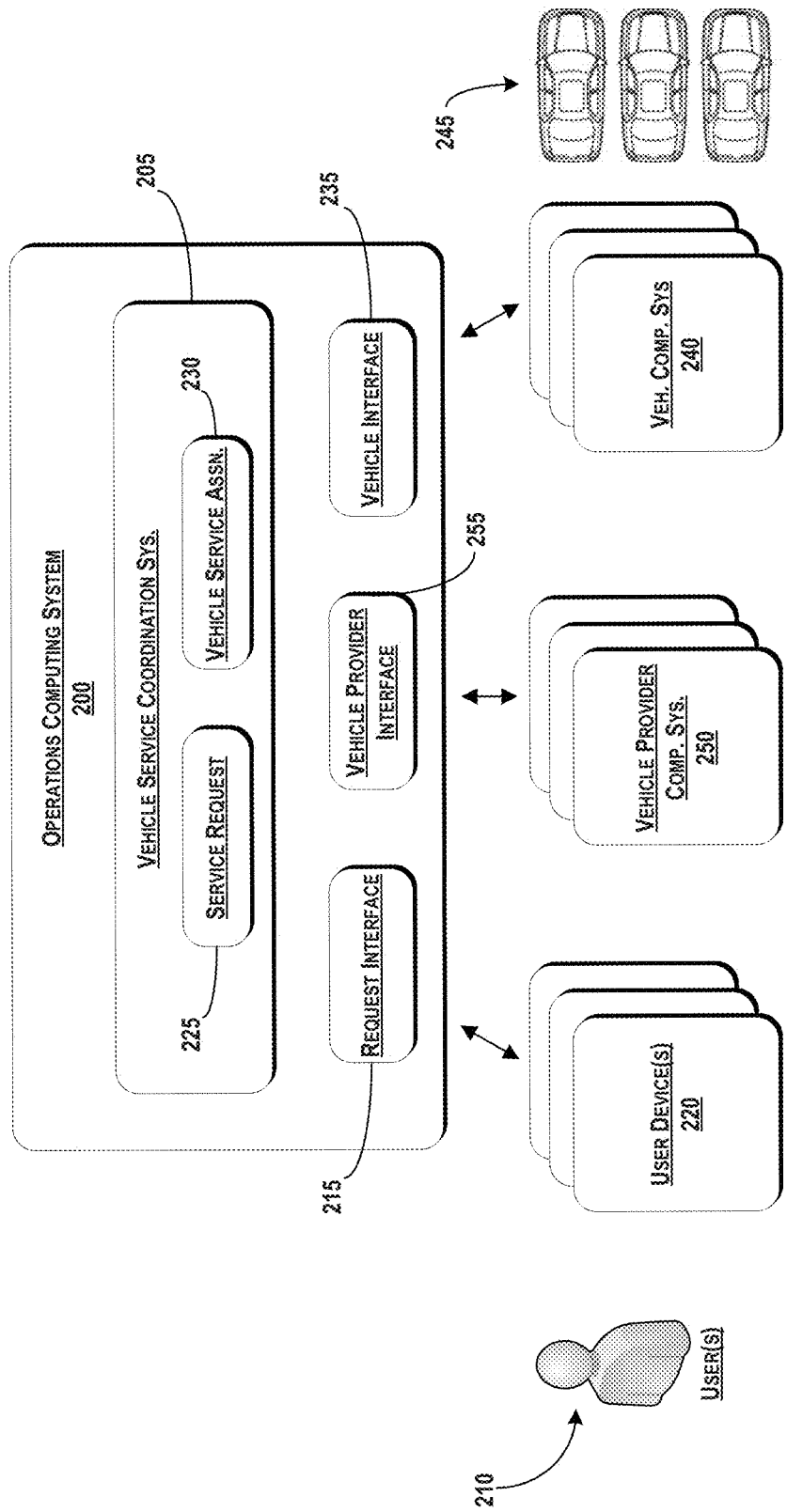
FIG. 2 depicts an example operations computing system of a service entity according to example embodiments of the present disclosure.

An operations computing system 200 can be configured to select and assign tasks to autonomous vehicles. FIG. 2 depicts the example operations computing system 200 according to example embodiments of the present disclosure. The operations computing system 200 can be associated with one or more service entities. The operations computing system 200 can include, for example, a vehicle service coordination system 205, and/or other systems.

The vehicle service coordination system 205 can be configured to coordinate the provision of one or more vehicle services to one or more users 210. For instance, the operations computing system 200 can include a request interface 215. The request interface 215 can allow the operations computing system 200 to communicate with one or a plurality of user devices 220 (e.g., mobile phones, desktops, laptops, tablets, game systems, etc.). The request interface 215 can allow the operations computing system 200 and the user device(s) 220 to communicate data to and/or from one another. For example, the user device(s) 220 can communicate (e.g., via the request interface 215) data indicative of a service request 225 for a vehicle service to an operations computing system 200 associated with a service entity.

The vehicle service coordination system 205 can be configured to generate a service assignment 230. A service assignment 230 can be indicative of a vehicle service (e.g., requested by a user via the user device(s) 220) to be performed by a vehicle (e.g., an autonomous vehicle). A service assignment 230 can include a variety of information associated with the vehicle service, the requesting user, the user device, the service entity, etc. For example, a service assignment 230 can include data indicative of an associated user and/or user device (if permitted), data indicative of a compensation parameter (e.g., the compensation for delivering an item to a user, couriering an item for a user, transporting a user, etc.), data indicative of one or more locations (e.g., origin location, destination location, intermediate location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of user preferences (e.g., music, temperature, etc.), data indicative of one or more vehicle service parameters (e.g., luggage types, handle-with-care instructions, special pick-up requests, etc.), data indicative of the vehicle capacity required/preferred for the vehicle service (e.g., the number of seats with seatbelts, an amount of trunk space, an amount of cabin space, etc.), data indicative of user ratings, data indicative of one or more vehicle service incentives (e.g., increased compensation, increased ratings, priority treatment, etc.), and/or other types of data.

The operations computing system 200 (e.g., the vehicle service coordination system 205) can identity one or more autonomous vehicles that are available for a service assignment 230. The vehicle service coordination system 205 can identify autonomous vehicle(s) that are online with the service entity associated with the operations computing system 200. The vehicle service coordination system 205 can select an autonomous vehicle for the service assignment based at least in part on the data indicated in the service assignment. For example, the vehicle service coordination system 205 can select an autonomous vehicle that meets the preferences of the user 210, has the necessary capacity, is the requested vehicle type, etc. Additionally, or alternatively, the vehicle service coordination system 205 can select an autonomous vehicle based at least in part on the current and/or future location of the autonomous vehicle. For example, the vehicle service coordination system 205 can select an autonomous vehicle that is proximate to an origin location associated with the service assignment 230. Additionally, or alternatively, the vehicle service coordination system 205 can select an autonomous vehicle that is within and/or nearby a geographic area that includes the origin location and/or destination location of the service assignment 230.

The operations computing system 200 can utilize a vehicle interface 235 to communicate data indicative of a service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 200 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a service assignment 230 to one or more vehicle computing system(s) 240 of the autonomous vehicles 245 that the operations computing system 200 selects for the service assignment 230. Additionally, or alternatively, the vehicle computing system(s) 240 can communicate data associated with the autonomous vehicle(s) 245 to the operations computing system 200. In this way, the operations computing system 200 can coordinate the performance of vehicle service(s) for user(s) 210 by the autonomous vehicle(s) 245 as well as monitor the autonomous vehicle(s) 245. The autonomous vehicle(s) 245 can include and/or be configured in the same or a similar manner to the autonomous vehicle 105 shown in FIG. 1.

In some implementations, the operations computing system 200 can select a non-autonomous vehicle (e.g., human driven vehicle) for a service assignment 230. For example, the vehicle service coordination system 205 can select a non-autonomous vehicle that is proximate to a location associated with the service assignment 230. Additionally, or alternatively, the vehicle service coordination system 205 can select a non-autonomous vehicle that is within and/or nearby a geographic area that includes the origin location and/or destination location of the service assignment 230. The operations computing system 200 can communicate data indicative of a service assignment 230 to one or more computing devices associated with the selected non-autonomous vehicle (e.g., a mobile device of the vehicle operator). The service assignment 230 can be indicative of a request that the operator provide the requested vehicle service to a user associated with the service assignment 230.

In some implementations, the operations computing system 200 can communicate with one or more vehicle provider computing systems 250 (associated with one or more vehicle providers) via a vehicle provider interface 255. The vehicle provider computing system(s) 250 can be associated with vehicle provider(s) that are associated with the autonomous vehicle(s) 245. As described herein, a vehicle provider can include, for example, an owner, a manufacturer, a vendor, a manager, a coordinator, a handler, etc. of the autonomous vehicle 105 (e.g., a third party, etc.). The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system 250 that is remote from the autonomous vehicle 105 to communicate (e.g., over one or more wireless communication channels) with the vehicle computing system(s) 240 of one or more autonomous vehicles 245. A vehicle provider computing system 250 can include a server system (e.g., of an entity), a user device (e.g., of an individual owner), and/or other types of computing systems.

The vehicle provider interface 255 can allow the operations computing system 200 and one or a plurality of vehicle provider computing systems 250 (e.g., of one or more vehicle providers, etc.) to communicate data to and/or from one another. For example, the operations computing system 200 can communicate, via the vehicle provider interface 255, data indicative of a service assignment 230, and/or other data as described herein, to one or more vehicle provider computing system(s) 250. The vehicle provider computing system(s) 250 can then communicate such data to the vehicle computing system(s) 240. Additionally, or alternatively, the vehicle provider computing system(s) 250 can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept service assignment(s) 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

Returning to FIG. 1, the autonomous vehicle 105 can be configured to determine a plurality of drop-off locations for a given service assignment 230. The each of the drop-off locations can be associated with a different purpose. For instance, the autonomous vehicle 105 can determine a drop-off location for a user 210 and another, separate drop-off location for an item 195 (luggage, baggage, packages, personal effects, etc.). To do so, the vehicle computing system 100 can obtain data indicative of a destination location to which a user 210 is to be transported. For example, the vehicle computing system 100 can obtain data indicative of a service assignment 230 associated with an autonomous vehicle 105. The service assignment 230 can be indicative of a destination location associated with a user 210.

Figure 3:
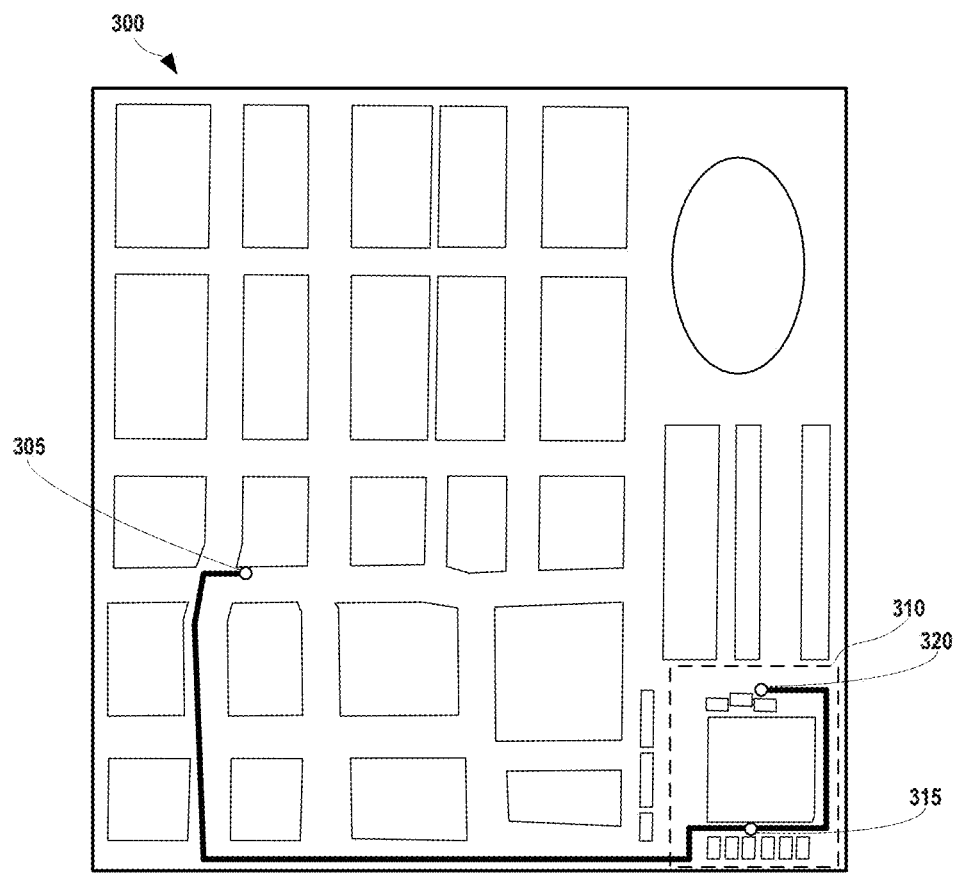
FIG. 3 depicts an example diagram of an geographic area according to example embodiments of the present disclosure.

The destination location can be one that the user 210 requested that the user 210 be transported to, from an origin location. For example, FIG. 3 depicts an example diagram of a geographic area 300 according to example embodiments of the present disclosure. The data indicative of the service assignment 230 (e.g., obtained by the vehicle computing system 100) can include data indicative of an origin location 305 and a destination location 310 specified by the user 210. The origin location 305 can be represented as coordinate (e.g., GPS coordinate, etc.), latitude-longitude pair, address, semantic location, and/or other type of identifier. The origin location 305 can be, for example, a home, hotel, etc. The destination location 310 can be as coordinate (e.g., GPS coordinate, etc.), latitude-longitude pair, address, semantic location, and/or other type of identifier. The destination location 310 can include, for example, an airport, hotel, etc.

Returning to FIG. 1, the user 210 can be associated with an item 195 to be transported. As described herein, the item 195 can be, for example, a personal effect of the user (e.g., baggage item, luggage item, etc.). The vehicle computing system 100 can obtain data indicative of an item 195 associated with the user 210. The vehicle computing system 100 can obtain data indicative of the item 195 before, after, and/or while the item 195 is onboard the autonomous vehicle 105. For instance, the service request 225 may specify that the user 210 will be accompanied by one or more item(s) 195. The corresponding service assignment 230 can also be indicative of the item 195. In some implementations, the service request 225 and/or the service assignment 230 can indicate that one or more items 195 may (or will be) loaded onto the autonomous vehicle 105. In some implementations, the service request 225 and/or the service assignment 230 can indicate characteristics of the item(s) 195 such as, for example, the type, size, weight, shape, number, etc. In this way, the autonomous vehicle 105 may be informed about the item(s) 195 before arriving at an origin location 305 associated with the user 210.

In some implementations, the vehicle computing system 100 can obtain data associated with an item 195 via a user device 220. For instance, a user 210 can obtain image data of an item 195 (e.g., luggage, etc.) via an image capture device of a user device 220 (e.g., a camera, etc.). The user device 220 can communicate the image data to a remote computing system (e.g., an operations computing system 200, etc.) and/or an autonomous vehicle 105. The vehicle computing system 100 can obtain the image data (e.g., from the user device 210, from a remote computing system, etc.). The image data can be indicative of and/or analyzed to determine characteristic(s) of the item 195 (e.g., size, shape, weight, type, etc.). The vehicle computing system 100 can obtain the image data when it obtains the service assignment 230 (e.g., as data included therein), before it arrives at the origin location 305, while it is at the origin location 305, and/or after it leaves the origin location 305.

In some implementations, the vehicle computing system 100 can obtain data indicating that an item 195 is onboard the autonomous vehicle 105 via one or more sensor(s) 125 located onboard the autonomous vehicle 105. As described herein, the sensor(s) 125 can include image sensors (e.g., cameras, etc.), motion sensors, weight sensors, and/or other types of sensors. For example, the autonomous vehicle 105 can include one or more sensors associated with a compartment of the autonomous vehicle 105 (e.g., the trunk, the cabin, etc.) and such sensor(s) can be configured to obtain sensor data 140 indicating that the compartment has been accessed (e.g., by a user) and/or closed. The vehicle computing system 100 can determine that an item 195 is onboard the autonomous vehicle 105 when a compartment sensor indicates that the compartment has been accessed (and closed). Additionally, or alternatively, the autonomous vehicle 105 can include an onboard weight sensor (e.g., located in the vehicle's trunk, interior cabin, etc.) that is configured to obtain data indicative of the presence of an item 195 onboard the autonomous vehicle 105 (e.g., within the vehicle's trunk, etc.).

In some implementations, the autonomous vehicle 105 can be configured to perform an item-related action that is associated with the requested destination location 310. An item-related action can be an operation performed by the autonomous vehicle that is based on the presence and/or characteristic(s) of one or more item(s) 195 of the user 210. For instance, destination location 310 can include an airport. An item 195 can be a luggage item. The service assignment 230 can indicate that the user 210 is to be transported to the airport. The vehicle computing system 100 can obtain (e.g., via a sensor 125 onboard the autonomous vehicle 105), data indicative of a weight of the item 195 (e.g., the weight of the luggage item). For example, the item 195 can be placed in the trunk of the autonomous vehicle 105 and the vehicle computing system 100 can obtain data indicative of the weight of the item 195 via a trunk weight sensor. The vehicle computing system 100 can determine whether the item 195 is associated with an overage charge based at least in part on the weight of the item 195. For example, the user 210 when entering information into a user device 210 (e.g., to generate the service request 225), the user 210 may have entered which airline the user 210 will be flying. The user 210 can specify the particular airline, flight information (e.g., flight number, etc.), a specific-airline departure terminal, etc. The service request 225 can be indicative of such information, which can also be included in the service assignment 230 for the autonomous vehicle 105. The vehicle computing system 100 and/or another computing system (e.g., an operations computing system 200) can be configured to communicate with a computing system associated with one or more airlines and/or otherwise access a database indicative of the airline-related data. The vehicle computing system 100 and/or another computing system can obtain data associated with an airline such as, for example, data indicative of an airline's baggage parameters (e.g., weight limits, fees, numbers, etc.). The vehicle computing system 100 and/or another computing system can determine whether the item 195 onboard the autonomous vehicle 105 is associated with an overage charge based at least in part on the weight of the item 195 and/or the airline-related data. For example, the item 195 may be associated with an overage charge because the weight of the item 195 exceeds the airline's weight limit. In some implementations, the vehicle computing system 100 can determine that the item 195 is associated with an overage charge based at least in part on image data associated with the item 195 (e.g., captured via the user device 220, etc.).

Figure 5:
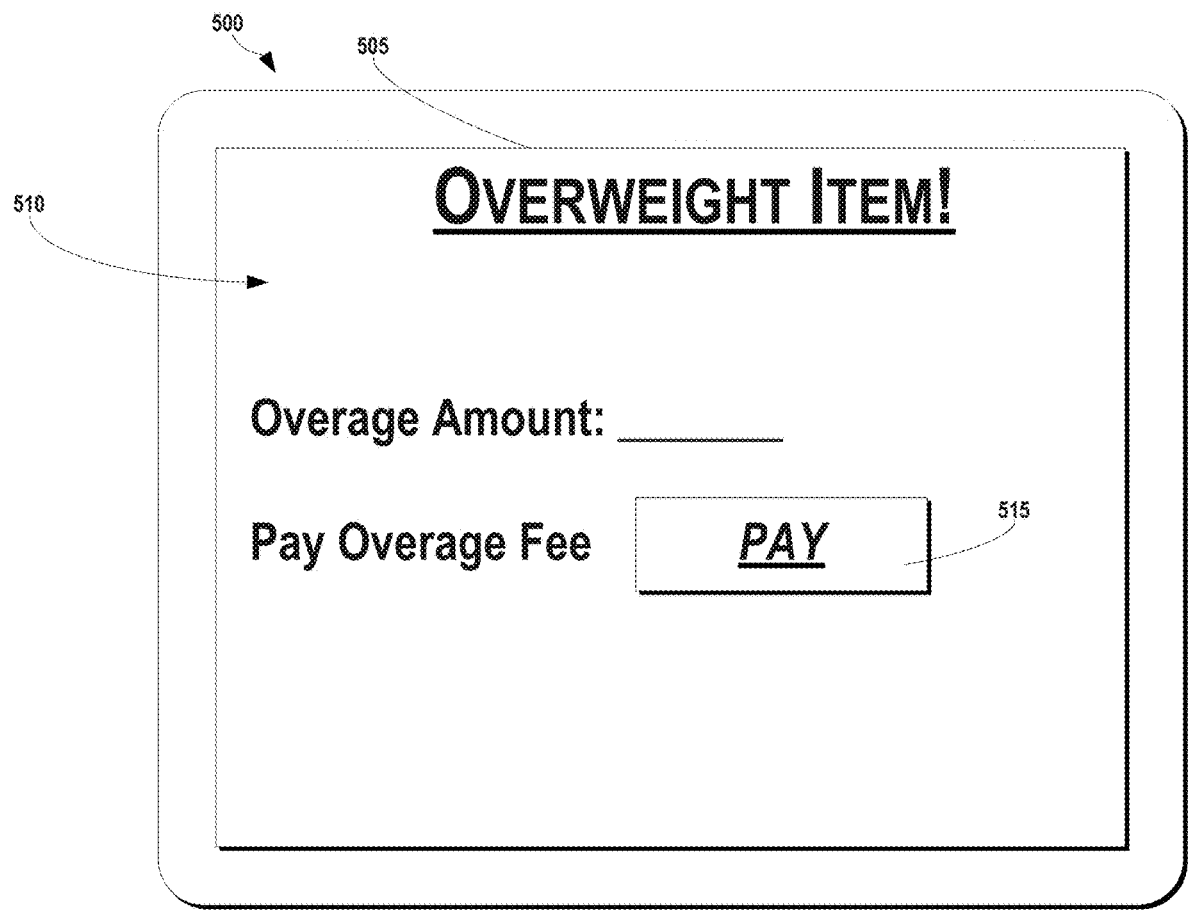
FIG. 5 depicts an example display device according to example embodiments of the present disclosure.

In the event that the vehicle computing system 100 and/or another computing system determines that the item 195 would be associated with an overage charge, the user 210 can be informed. For example, FIG. 5 depicts an example user device 500 according to example embodiments of the present disclosure. The user device 500 can include a display device 505 (e.g., display screen, etc.). In response to determining that the item 195 is associated with the overage charge, the vehicle computing system 100 (and/or another computing system) can provide, for display via a user interface 510 on a display device 500, data indicative of the overage charge associated with the item 195. In some implementations, the user device 500 can be associated with the user 210. For example, the data indicative of the overage change can be displayed via a user interface 510 presented on a display device 505 of a mobile phone, tablet, laptop, gaming system, e-book reader, etc. of the user 210. In some implementations, the user device 500 can be associated with the autonomous vehicle 105. For example, the data indicative of the overage change can be displayed via a user interface 510 presented on a display device 505 of a tablet, laptop, etc. located in (and typically kept within) the interior cabin of the autonomous vehicle 105. Additionally, or alternatively, the vehicle computing system 100 (and/or another computing system) can provide, for output via an audio output device (e.g., speaker, etc.), data indicative of an audio notification that indicates the item 195 is associated with (or likely associated with) an overage charge.

In some implementations, the user 210 can complete a transaction to address the overage charge. For example, the user interface 510 can include an interface element 515 (e.g., soft button, hyperlink, etc.) that can allow the user 210 to pay for the overage charge associated with the item 195. For example, the user 210 can provide a user input associated with a user interface element 515 (e.g., on the user's phone, onboard tablet, etc.). In some implementations, the user 210 can be directed to a second user interface (e.g., of the airline) that allows the user to enter payment information for the overage charge. Additionally, or alternatively, the user interface 210 may allow the user 210 to enter payment information and/or utilize account information associated with the service entity to pay for the overage charge (e.g., utilize a linked credit card used for the service request to pay for the overage charge, etc.). The vehicle computing system 100 and/or another computing system can obtain data indicating that the user 210 would like to pay for the overage charge (e.g., from the user device 500). The vehicle computing system 100 and/or another computing system can direct the user 210 to a second user interface (e.g., of the airline) and/or securely facilitate payment of the overage charge (e.g., by releasing payment from the user's account to a system associated with the airline). The display device 505 can present a user interface indicating that the transaction has been complete. In some implementations, the autonomous vehicle 105 can include a printing device (e.g., printer, etc.) to generate a printed medium (e.g., sticker, ticket, etc.) that indicates the overage fee has been addressed.

In some implementations, the user 210 and the item 195 can enter the autonomous vehicle 105 at different times. For instance, the item(s) 195 can be loaded onboard the autonomous vehicle 105 at a first time and a user 210 can board the autonomous vehicle 105 at a second time. The second time can be a different time than the first time. The first time can occur before the second time, or vice versa. By way of example, the autonomous vehicle 105 can travel to an origin location 305 (e.g., a hotel). The autonomous vehicle 105 can first pick-up an item 195. For example, an individual (e.g., a hotel bellhop) can put an item 195 (e.g., a luggage item, etc.) in the autonomous vehicle 105 at a first time, at the origin location 305. The autonomous vehicle 105 can pick-up the user 210 at a second time, after the first time. For example, the user 210 associated with the item 195 can board the autonomous vehicle 105 at the origin location (e.g., at the hotel) or another location (e.g., a retail store) at the second time, after the first time (when the item was loaded into the autonomous vehicle 105).

With reference to FIG. 3, the vehicle computing system 100 can determine separate drop-off locations for user(s) 210 and item(s) 195. For instance, the vehicle computing system 100 can determine a first drop-off location 315 for the user 210 and a second drop-off location 320 for the item 195 based at least in part on the destination location 310. The first drop-off location 315 for the user 210 is different than the second drop-off location 320 for the item 195. The drop-off location(s) can be sub-locations associated with the destination location 310.

The vehicle computing system 100 can determine the drop-off location(s) based at least in part on data associated with the destination location 310. For instance, the vehicle computing system 100 and/or another computing system (e.g., an operations computing system 200) can obtain map data associated with the destination location 310. The vehicle computing system 100 and/or another computing system can determine the first drop-off location 315 for the user 210 and the second drop-off location 320 for an item 195 based at least in part on the map data associated with the destination location 310.

The map data can provide more granular information about the layout, infrastructure, etc. of the destination location 310. As shown, for example, in FIG. 4, a destination location 310 can include one or more features such as different areas (e.g., publically accessible areas, private areas, restricted areas, areas for different purposes, etc.), a plurality of travel ways, signage, etc. The map data associated with the destination location 310 can be indicative of the one or more features of the destination location 310. By way of example, the destination location 310 can be an airport. The vehicle computing system 100 can obtain map data associated with the airport. The map data associated with the airport can be indicative of the departure area, arrival area, parking area, baggage area, and/or other areas, zones, travel ways, etc. of the airport.

The vehicle computing system 100 and/or another computing system (e.g., an operations computing system 200) can determine that the user 210 desires to travel to the airport and obtain (e.g., from a local and/or remote memory) the map data associated with the airport. The vehicle computing system 100 and/or another computing system can use the map data to determine where to drop-off the user 210 and where to drop-off the item(s) 195. For example, the vehicle computing system 100 and/or another computing system can determine the first drop-off location 315 is associated with a departure area 405 of the airport (e.g., located within the departure area). The vehicle computing system 100 and/or another computing system can determine, for example, that the second drop-off location 320 is associated with a baggage area 410 of the airport (e.g., located within the baggage area).

The vehicle computing system 100 and/or another computing system can also, or alternatively, utilize other types of data associated with the destination location 310 to determine the drop-off locations. For example, a data structure (e.g., a table, list, hierarchy, tree, other types of data structures, with/without references, pointers, etc.) can include data indicative of the destination location. The data structure can include known drop-off locations associated with each destination location. For example, the vehicle computing system 100 and/or another computing system can access a memory that stores a data structure including a data tree with a plurality of parent nodes. Each parent node can be indicative of a destination location. For example, a first parent node can be indicative of the destination location 310 (e.g., an airport), a second parent node can be indicative of a second location (e.g., a hotel), etc. Each parent node can have child nodes or branches. Each of the child nodes can be indicative of a drop-off location. For example, a first parent node representing an airport can have a first plurality of child nodes. A first child node can represent the first drop-off location 315 for the user 210 (e.g., a departure drop-off area, etc.) and a second child node can represent a second drop-off location 320 for an item 195 (e.g., a baggage drop-off area, etc.). The vehicle computing system 100 and/or another computing system can traverse the data structure to find the first parent node that is indicative of the destination location 310 (e.g., the airport). The vehicle computing system 100 and/or another computing system can traverse the child nodes associated with the first parent node to determine the first drop-off location and the second drop-off location.

To the extent that the drop-off locations are determined by a computing system that is remote from the autonomous vehicle 105, data indicative of the first drop-off location 315 and the second drop-off location 320 can be communicated to the autonomous vehicle 105. The vehicle computing system 100 can obtain such data and determine the first and second drop-off locations based at least in part on such data.

Figure 4:
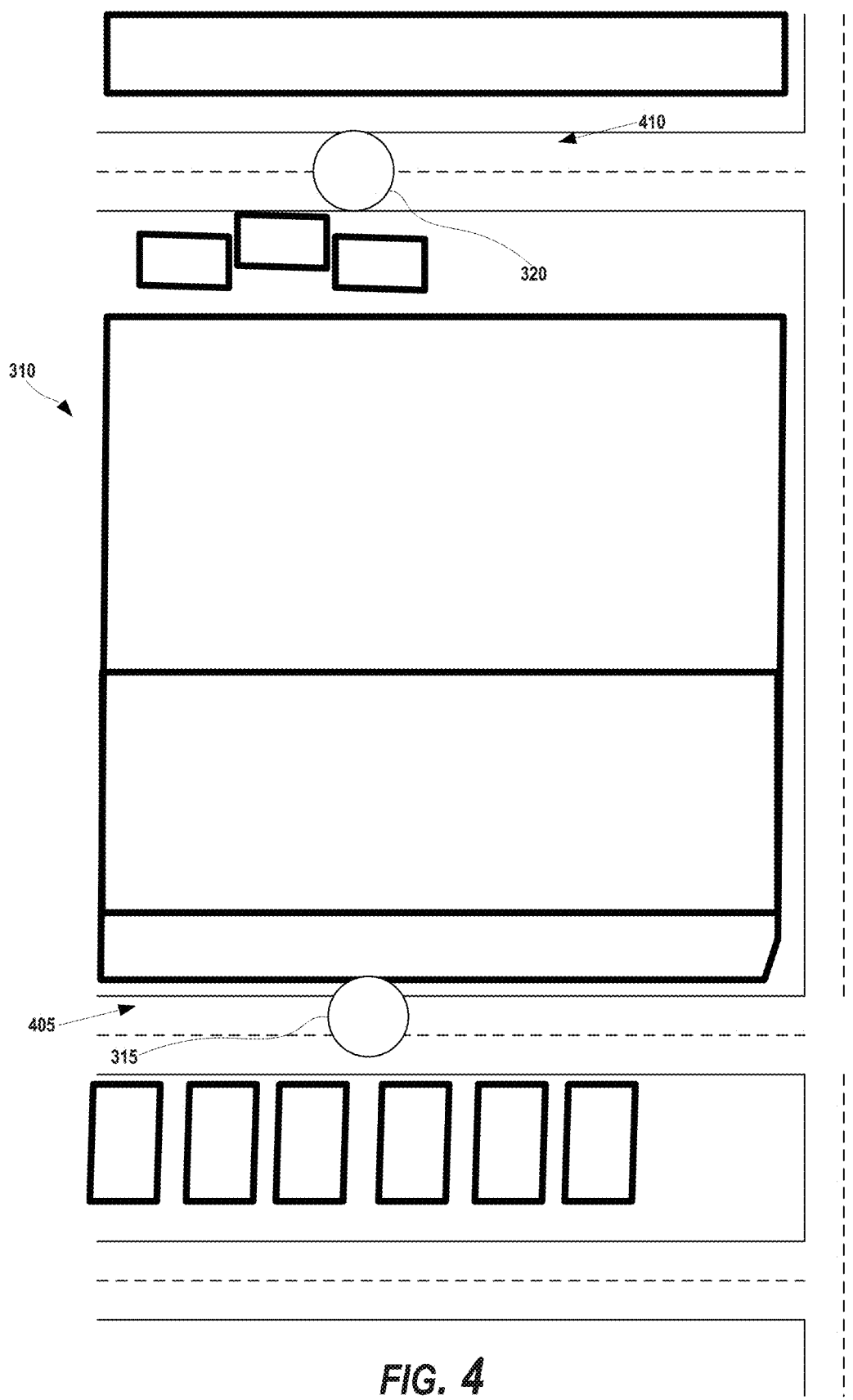
FIG. 4 depicts an example diagram of a destination location according to example embodiments of the present disclosure.

With reference to FIGS. 3 and 4, the autonomous vehicle 105 can travel to the first and second drop-off locations 315, 320 to drop-off user(s) 210 and item(s) 195 at their respective locations. For instance, the vehicle computing system 100 can cause the autonomous vehicle 105 to initiate a first motion control to travel to the first drop-off location 315 for a user 210 and a second motion control to travel to the second drop-off location 320 for an item 195. A motion control can be an operation, action, etc. that is associated with controlling the motion of the autonomous vehicle 105.

For instance, the vehicle computing system 100 (e.g., an onboard autonomy system) can determine a motion plan 180 that can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan 180 into instructions for the appropriate vehicle control component (e.g., acceleration control, brake control, steering control, etc.). The vehicle computing system 100 can generate motion plan(s) 180, which can be implemented such that the autonomous vehicle 105 travels to the first drop-off location 315 for a user 210 and the second drop-off location 320 for an item 195. The autonomous vehicle 105 can travel to the first drop-off location 315 before the second drop-off location 320, or vice-versa. The user 210 can disembark from the autonomous vehicle 105 at the first drop-off location (e.g., at the departure area of an airport) and an item 195 can be removed from the autonomous vehicle 105 at the second drop-off location 320 (e.g., at the baggage area of the airport). In some implementations, an item 195 can be placed in a removable portion of the autonomous vehicle 105 (e.g., a movable pod, an autonomous robot, etc.), which can be utilized to remove the item 195 from the autonomous vehicle 105 and transport the item 195 to a certain area (e.g., to a conveyor for processing).

In some implementations, the autonomous vehicle 105 can transport, to the destination location 310, an item that is not associated with a user 210 that is being transported in the autonomous vehicle 105. For instance, the autonomous vehicle 105 can obtain a service assignment 230 that is indicative of a request to deliver an item (e.g., a box to be shipped, etc.) to the destination location 310. The autonomous vehicle 105 can travel to retrieve the item at a pick-up location (e.g., before or after picking up the user 210). The autonomous vehicle 105 can travel to the destination location 310 to drop-off the user 210 and the item, at separate drop-off locations associated therewith. For example, the vehicle computing system can cause the autonomous vehicle 105 to initiate a motion control(s) such that the autonomous vehicle 105 travels to the first drop-off location 315 for the user 210 (e.g., a departure area), and a second drop-off location for item(s) 195 associated with the user 210 (e.g., a baggage area) and/or a third drop-off location for item(s) not associated with the user 210 (e.g., a shipping/cargo area, etc.). The autonomous vehicle 105 can drop-off the item(s) that are not associated with the user 210 before and/or after dropping-off the user 210 and/or the item(s) 195 associated with the user 210.

Figure 6A:
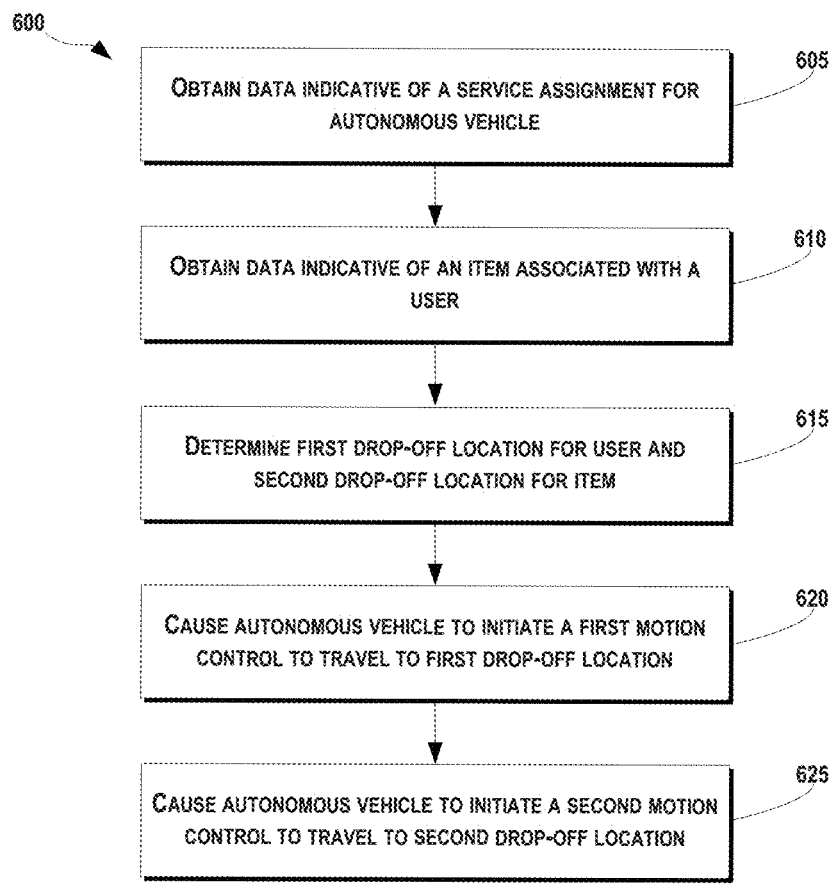
FIGS. 6A-B depict example methods according to example embodiments of the present disclosure.

FIG. 6A depicts a flow diagram of an example method 600 for controlling an autonomous vehicle according to example embodiments of the present disclosure. One or more portion(s) of the method 600 can be implemented by a computing system that includes one or more computing devices such as, for example, the computing systems described with reference to the other figures (e.g., a vehicle computing system 100/240, an operations computing system 200, a vehicle provider computing system 250, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 2, 5, 7, and/or 8), for example, to determine drop-off location(s) for an autonomous vehicle and control an autonomous vehicle. FIG. 6A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6A is described with reference to elements/terms described with respect to other systems and figures for example illustrated purposes and is not meant to be limiting. One or more portions of method 600 can be performed additionally, or alternatively, by other systems.

At (605), the method 600 can include obtaining data indicative of a service assignment for an autonomous vehicle. For instance, a computing system (e.g., a vehicle computing system 100, an operations computing system 200, a vehicle provider computing system 250, etc.) can obtain data indicative of a service assignment associated with an autonomous vehicle. As described herein, the service assignment can be indicative of a destination location to which to transport a user (e.g., a transportation service assignment).

At (610), the method 600 can include obtaining data indicative of an item associated with a user. For instance, the computing system (e.g., vehicle computing system 100, etc.) can obtain data indicative of an item associated with the user that is to be transported to the destination location. In some implementations, the computing system can obtain data indicative of the item from the service assignment (e.g., which can indicate that the item will accompany a user), an onboard vehicle sensor (e.g., a weight sensor, etc.), and/or by another approach. For example, the destination location can include an airport to which the user would like to be transported. The user may indicate in a service request that the user will be transported with an item. The item can be, for example, a luggage item that the user is taking to the airport. The computing system can obtain data indicative of a service assignment that indicates the user is to be transported to the airport and that the user is to be accompanied by the luggage item. In some implementations, the service assignment can be indicative of one or more characteristics of the luggage item (e.g., size, shape, etc.). Additionally, or alternatively, the computing system can obtain, via a sensor onboard the autonomous vehicle, data indicating that the item (e.g., luggage item) is onboard the autonomous vehicle (e.g., a weight sensor located in the vehicle's trunk). The computing system can determine that the item is to be transported with the user to the destination location based at least in part on the sensor data indicating that the item is onboard the autonomous vehicle. In some implementations, the computing system (e.g., vehicle computing system 100, etc.) can obtain data indicative of an item not associated with the user that is to be transported to the destination location, as described herein.

Figure 6B:
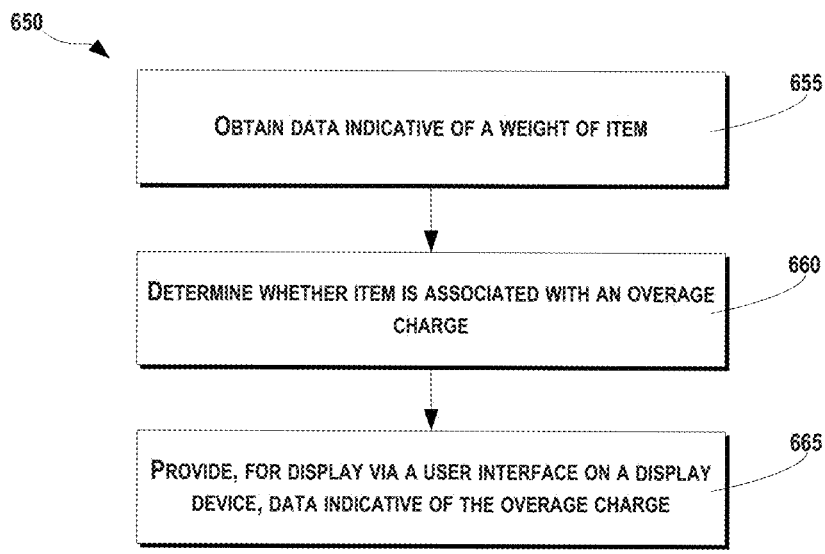

In some implementations, the computing system can perform an action associated with the item. For instance, FIG. 6B depicts a flow diagram of an example method 650 for performing an item-related action according to example embodiments of the present disclosure. One or more portion(s) of the method 650 can be implemented by a computing system that includes one or more computing devices such as, for example, the computing systems described with reference to the other figures (e.g., a vehicle computing system 100/240, an operations computing system 200, a vehicle provider computing system 250, etc.). Each respective portion of the method 650 can be performed by any (or any combination) of one or more computing devices. Moreover, one or more portion(s) of the method 650 can be implemented as an algorithm on the hardware components of the device(s) described herein (e.g., as in FIGS. 1, 2, 5, 7. and/or 8). FIG. 6B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6B is described with reference to elements/ terms described with respect to other systems and figures for example illustrated purposes and is not meant to be limiting. One or more portions of method 650 can be performed additionally, or alternatively, by other systems.

At (655), the method 650 can include obtaining data indicative of a weight of an item. For instance, the computing system can obtain, via a sensor onboard the autonomous vehicle, data indicative of a weight of the item (and/or other characteristics of an item). In some implementations, the sensor can be located in a compartment of the autonomous vehicle such as, for example, the trunk of the autonomous vehicle. The sensor (e.g., a weight sensor, e.g.,) can acquired data indicative of the weight of an item when the item is placed in contact with (and provides a force to) the sensor. The sensor can communicate data indicative of the weight of the item to the computing system.

At (660), the method 650 can include determining whether an item is associated with an overage charge. For instance, the computing system can determine whether the item is associated with an overage charge based at least in part on the weight of the item (and/or other characteristics of an item). As described herein, the computing system can access airline data to determine the luggage parameters for an airline (e.g., a weight limit penalty threshold, etc.). The computing system can determine whether the item (e.g., a luggage item, etc.) is associated with an overage charge (e.g., a fee for exceeding a weight limit penalty threshold) based at least in part on the weight if the item and the airline data (e.g., whether and how much the weight of the item exceeds the weight limit penalty threshold).

At (665), the method 650 can include providing, for display via a user interface on a display device, data indicative of the overage charge. For instance, in response to determining that the item is associated with the overage charge, the computing system can provide, for display via a user interface on a display device, data indicative of the overage charge associated with the item. In some implementations, the user can provide user input to complete a transaction to address the overage charge. In some implementations, a printed medium can be produced, indicating that the overage charge has been addressed.

Returning to FIG. 6B, at (615), the method 600 can include determining a first drop-off location for a user and second drop-off location for an item. For instance, the computing system (e.g., the vehicle computing system, etc.) can determine a first drop-off location for the user and a second drop-off location for the item based at least in part on the destination location. As described herein, the first drop-off location for the user is different than the second drop-off location for the item. By way of example, the destination location can include an airport and the item associated with the user can be a luggage item. The computing system can determine that the first drop-off location (e.g., for the user) is associated with a departure area of the airport and that the second drop-off location (e.g., for the item) is associated with a baggage area of the airport.

The drop-off locations associated with a destination location can be identified in a variety of manners. In some implementations, the computing system can obtain map data associated with the destination location. The computing system can determine the first drop-off location for the user and the second drop-off location for the item based at least in part on the map data associated with the destination location. Additionally, or alternatively, the computing system can access a data structure (e.g., a data tree) stored in an accessible memory. The computing system can traverse the data structure to determine the drop-off locations associated with a particular destination location.

At (620), the method 600 can include causing the autonomous vehicle to initiate a first motion control to travel to the first drop-off location. For instance, the computing system (e.g., the vehicle computing system, etc.) can cause the autonomous vehicle to initiate a first motion control to travel to the first drop-off location for the user. The computing system can cause the autonomous vehicle to initiate a second motion control to travel to the second drop-off location for the item, at (625). As described herein, a motion control can be an operation, action, etc. that is associated with controlling the motion of the autonomous vehicle. For instance, the computing system can communicate one or more signals that cause the autonomous vehicle to initiate an action to begin travelling to the first drop-off location. The signal(s) can be communicated to an autonomy computing system (e.g., a motion planning computing system) to indicate the destination of the autonomous vehicle. Additionally, or alternatively the signal(s) can be indicative of a motion plan that will allow the autonomous vehicle to travel to the destination location and the signals can be communicated (e.g., to a vehicle controller) for control of the vehicle control systems. Thus, the autonomous vehicle can be controlled to travel to the first drop-off location for the user and the second drop-off location for the item. In some implementations, the autonomous vehicle can travel to the first drop-off location for the user (e.g., at a first time) before the autonomous vehicle travels to the second drop-off location for the item (e.g., at a second time). Alternatively, the autonomous vehicle can travel to the second drop-off location for the item before the autonomous vehicle travels to the first drop-off location for the user. In some implementations, the autonomous vehicle can travel to the second drop-off location and/or another drop-off location for an item that is not associated with the user.

The methods 600 and/or 650 can be repeated for a subsequent service assignment associated with the autonomous vehicle.

Figure 7:
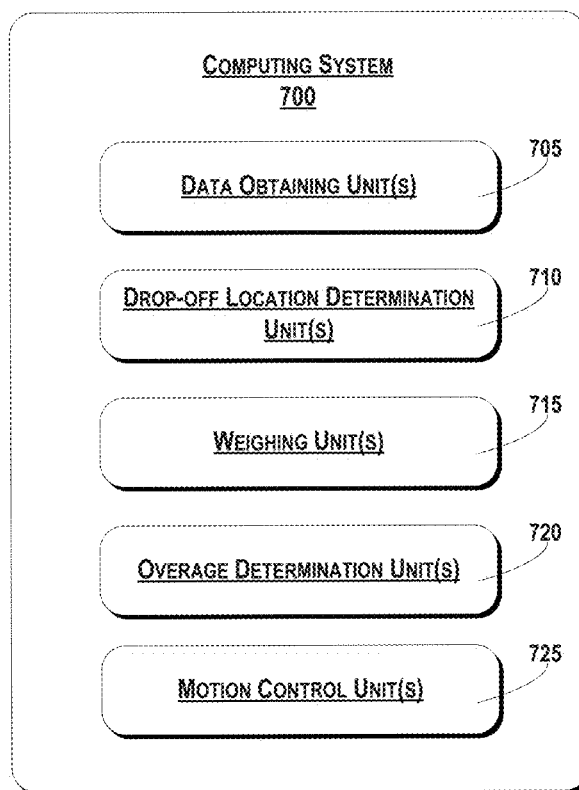
FIG. 7 depicts an example system with units for performing operations and functions according to example embodiments of the present disclosure.

Various means can be configured to perform the methods and processes described herein. For example, FIG. 7 depicts a diagram of an example a computing system 700 that includes various means according to example embodiments of the present disclosure. The computing system 700 can be and/or otherwise include, for example, the vehicle computing system 100/240, an operations computing system 200, a vehicle provider computing system 250, etc. The computing system 700 can include data obtaining unit(s) 705, drop-off location determination unit(s) 710, weighing unit(s) 715, overage determination unit(s) 720, motion control unit(s) 725, and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit (s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. Certain means can include other types of devices. For instance, the weighing unit(s) 715 can include weight sensor(s), scale(s), etc.

The means can be programmed to perform one or more algorithm(s) for carrying out the operations and functions described herein. For instance, the means can be programmed to perform one or more algorithm(s) for carrying out the operations and functions described herein. For instance, the means (e.g., the data obtaining unit(s) 705) can be configured to obtain data indicative of a service assignment associated with an autonomous vehicle (e.g., from an accessible local memory, etc.). As described herein, the service assignment can be indicative of a destination location (e.g., an airport) and/or other information (e.g., origin location, data associated with an item, etc.). The means (e.g., the data obtaining unit(s) 705) can obtain data indicative of an item associated with the user that is to be transported to the destination location. This can include data included within the service assignment, data provided by an onboard sensor, etc.

The means (e.g., the weighing unit(s) 715) can be configured to obtain (e.g., via a sensor onboard the autonomous vehicle, etc.) data indicative of a weight of the item (and/or other characteristics of an item). For instance, an item can be in contact with and provide a force to the weighing unit(s) 715. The weighing unit(s) 715 can be configured to calculate the weight of the item based at least in part on the force that is provided to the weighing unit(s) 715. The means (e.g., the overage determination unit(s) 720) can be configured to determine whether the item is associated with an overage charge based at least in part on the weight of the item. In response to determining the existence of an overage charge, data indicative of the overage charge associated with the item can be provided for display via a user interface of a display device.

The means (e.g., the drop-off location determination unit(s) 710) can be configured to determine separate drop-off locations for a user and an item. For instance, the means (e.g., the drop-off location determination unit(s) 710) can be configured to determine a first drop-off location for the user (e.g., a departure drop-off area) and a second drop-off location (e.g., a baggage area) for the item based at least in part on the destination location (e.g., an airport). As described herein, the first drop-off location for the user is different than the second drop-off location for the item. The means (e.g., the drop-off location determination unit(s) 710) can be configured to access map data and/or a data structure (e.g., via an accessible memory). The means (e.g., the drop-off location determination unit(s) 710) can be configured to determine drop-off locations based at least in part on the map data (e.g., designated areas indicated therein) and/or by traversing the data structure (e.g., a data tree indicative of drop-off locations for a destination location), as described herein.

The means can cause the autonomous vehicle to initiate a motion control to travel to the first drop-off location and the second drop-off location. The motion control unit(s) are one example means for initiating a motion control. The motion control unit can include, for example, one or more aspects of the vehicle's autonomy system, vehicle controller, vehicle control systems, etc.

Figure 8:
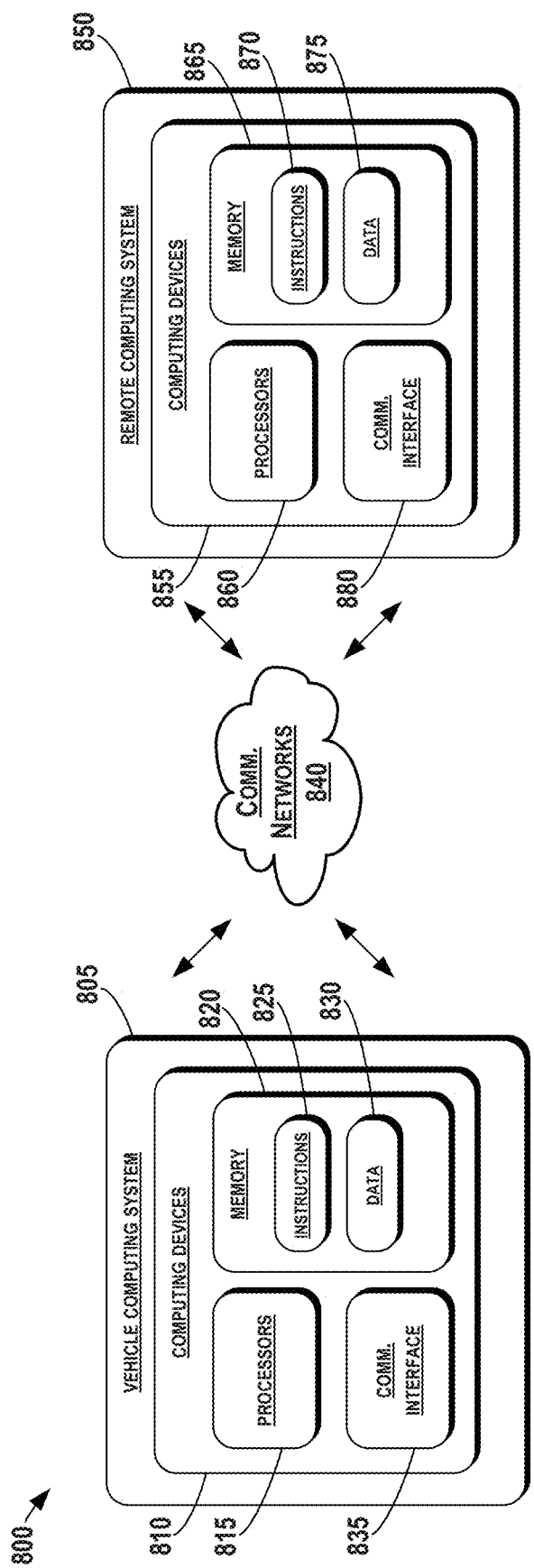
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems 100, 240 described herein. The example system 800 can include a remote computing system 850 (e.g., that is remote from the vehicle computing system). The remote computing system 850 can represent/correspond to an operations computing system 200 described herein and/or a vehicle provider computing systems 250 described herein. The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the vehicle provider computing systems (or for which it is configured), one or more of the operations and functions of the operations computing systems described herein (or for which it is configured), one or more of the operations and functions for determining a drop-off locations and controlling an autonomous vehicle, one or more portions of method(s) 600/650, and/or one or more of the other operations and functions of the computing systems described herein.

The memory 820 can store data 830 that can be obtained (e.g., acquired, received, retrieved, accessed, created, stored, etc.). The data 830 can include, for instance, sensor data, map data, vehicle state data, perception data, prediction data, motion planning data, data associated with a vehicle client, data associated with a service entity's telecommunications network, data associated with an API, data associated with a library, data associated with library parameters, data associated with service assignments, data associated with origin locations, data associated with destination locations, data associated with drop-locations, map data associated with destination locations, data structures associated with destination location(s), data indicative of a weight of an item, airline data, data indicative of overage charge, data associated with user interfaces, data associated with user input, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems described herein, any operations and functions of the vehicle provider computing systems, any of the operations and functions for which the operations computing systems and/or the vehicle computing systems are configured, one or more of the operations and functions of the vehicle computing system described herein, one or more of the operations and functions for determining drop-off locations and controlling an autonomous vehicle, one or more portions of method 600/650, and/or one or more of the other operations and functions described herein.

The memory 865 can store data 875 that can be obtained. The data 875 can include, for instance, data associated with service requests, communications associated with/provided by vehicles, data to be communicated to vehicles, application programming interface data, data associated with vehicles and/or vehicle parameters, data associated with drop-off locations, map data associated with destination locations, data structures associated with destination locations, data indicative of a weight of an item, airline data, data indicative of overage charge, data associated with user interfaces, data associated with user input, data associated with service assignments, data associated with acceptances and/or rejections of service assignments, data associated with different service entities, data associated with fleet(s) of vehicles, and/or other data/information such as, for example, that described herein.

The computing device(s) 855 can also include a communication interface 880 used to communicate with one or more system(s) onboard a vehicle and/or another computing device that is remote from the system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising;
obtaining data indicative of a service assignment associated with an autonomous vehicle, wherein the service assignment is indicative of a destination location to which to transport a user;
obtaining sensor data indicative of an item associated with the user that is to be transported to the destination location, wherein the sensor data is indicative of a weight of the item;
determining that the item is associated with an overage charge based at least in part on the weight of the item;
in response to determining that the item is associated with the overage charge based at least in part on the weight of the item, providing, for display through a user interface on a display device, data indicative of the overage charge associated with the item;
determining a first drop-off location for the user based at least in part on the service assignment;
determining, based at least in part on the sensor data and the service assignment, a second drop-off location for the item, wherein the first drop-off location for the user is different than the second drop-off location for the item;
causing the autonomous vehicle to initiate a first motion control to travel to the first drop-off location for the user; and
causing the autonomous vehicle to initiate a second motion control to travel to the second drop-off location for the item.

2. The computer-implemented method of claim 1, wherein the destination location comprises an airport, and wherein the item is a luggage item.

3. The computer-implemented method of claim 2, wherein the first drop-off location is associated with a departure area of the airport, and wherein the second drop-off location is associated with a baggage area of the airport.

4. The computer-implemented method of claim 1, wherein the sensor data is obtained by a sensor onboard the autonomous vehicle.

5. The computer-implemented method of claim 1, wherein determining the first drop-off location for the user and the second drop-off location for the item comprises:
obtaining map data associated with the destination location; and
determining the first drop-off location for the user and the second drop-off location for the item based at least in part on the map data associated with the destination location.

6. The computer-implemented method of claim 1, wherein the autonomous vehicle travels to the first drop-off location for the user before the autonomous vehicle travels to the second drop-off location for the item.

7. The computer-implemented method of claim 1, wherein the autonomous vehicle travels to the second drop-off location for the item before the autonomous vehicle travels to the first drop-off location for the user.

8. The computer-implemented method of claim 1, further comprising:
obtaining through a sensor onboard the autonomous vehicle, data indicative of a weight of the item.

9. The computer-implemented method of claim 1, wherein the user disembarks from the autonomous vehicle at the first drop-off location and the item is removed from the autonomous vehicle at the second drop-off location.

10. A computing system comprising:
one or more processors; and
one or more tangible, non-transitory, computer readable media that store instructions that are executable by the one or more processors to cause the computing system to perform operations comprising:
obtaining data indicative of a service assignment associated with an autonomous vehicle, wherein the service assignment is indicative of a destination location associated with a user;
obtaining sensor data indicative of an item associated with the user, wherein the item is onboard the autonomous vehicle, and wherein the sensor data is indicative of a weight of the item;
determining that the item is associated with an overage charge based at least in part on the weight of the item;
in response to determining that the item is associated with the overage charge based at least in part on the weight of the item, providing, for display through a user interface on a display device, data indicative of the overage charge associated with the item;
determining a first drop-off location for the user based at least in part on the service assignment;
determining, based at least in part on the sensor data and the service assignment, a second drop-off location for the item, wherein the first drop-off location for the user is different than the second drop-off location for the item; and
causing the autonomous vehicle to initiate
a first motion control to travel to the first drop-off location for the user and
a second motion control to travel to the second drop-off location for the item.

11. The computing system of claim 10, wherein the destination location comprises an airport, and wherein the first drop-off location is associated with a departure area of the airport, and wherein the second drop-off location is associated with a baggage area of the airport.

12. The computing system of claim 11, and wherein the item is a luggage item.

13. The computing system of claim 10, wherein determining the first drop-off location for the user and the second drop-off location for the item comprises:
obtaining map data associated with the destination location; and
determining the first drop-off location for the user and the second drop-off location for the item based at least in part on the map data associated with the destination location.

* * * * *